Aug. 29, 1933.  O. RICHTER  1,924,651
AIRCRAFT
Filed Sept. 2, 1932  2 Sheets-Sheet 1
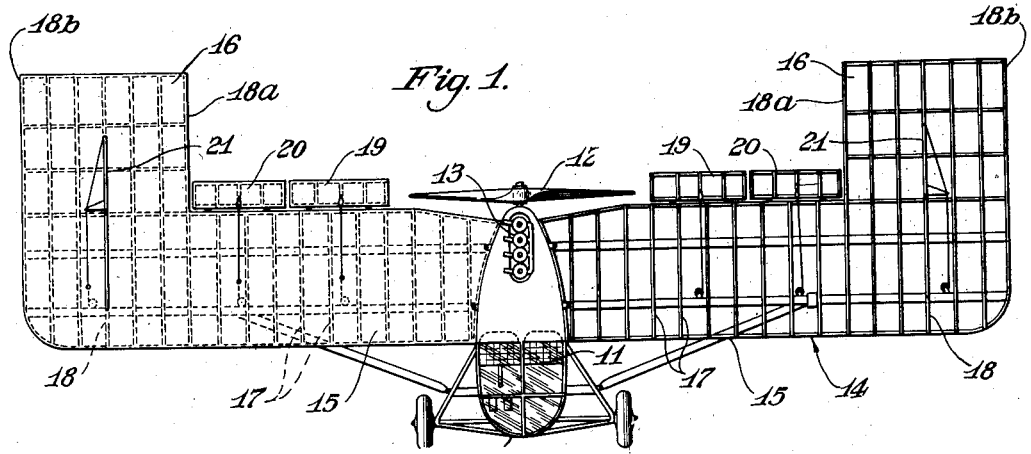
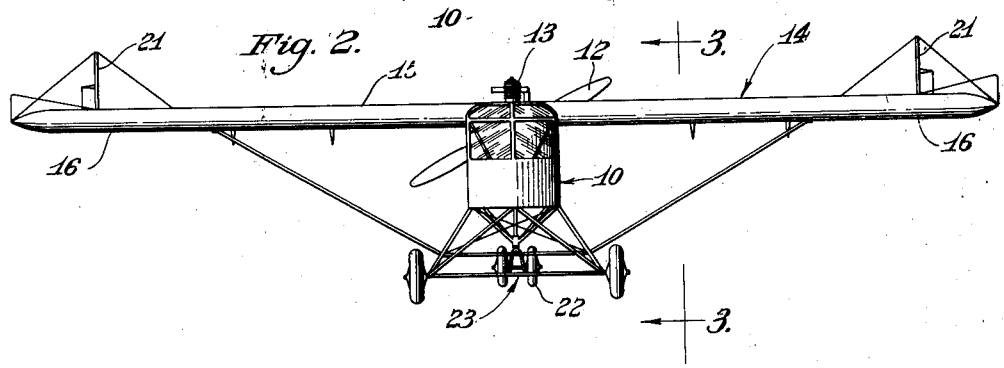
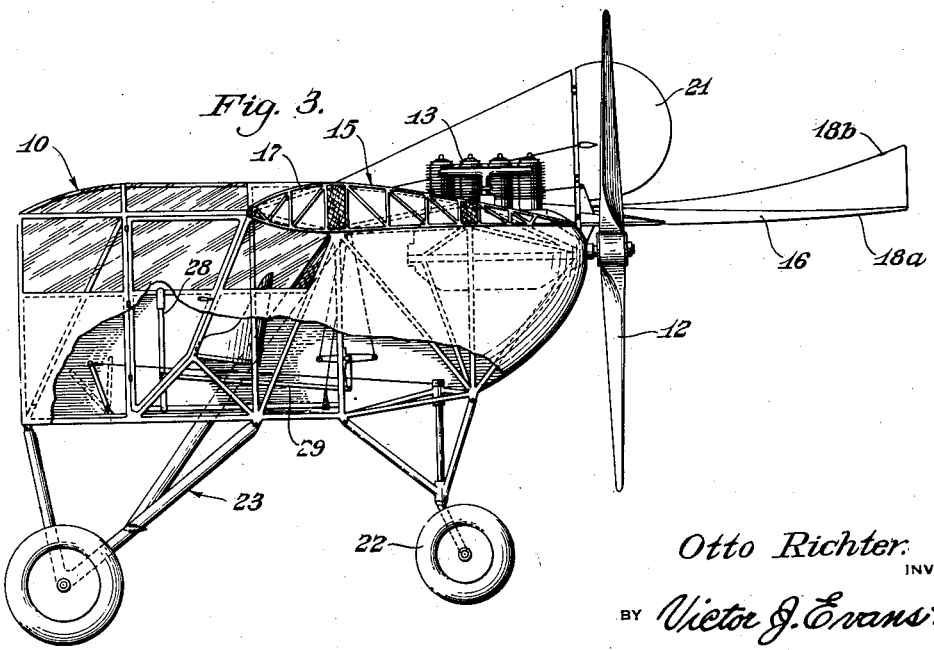
Otto Richter
INVENTOR
BY Victor J. Evans & Co.
HIS ATTORNEYS Aug. 29, 1933.  O. RICHTER  1,924,651
AIRCRAFT
Filed Sept. 2, 1932   2 Sheets-Sheet 2
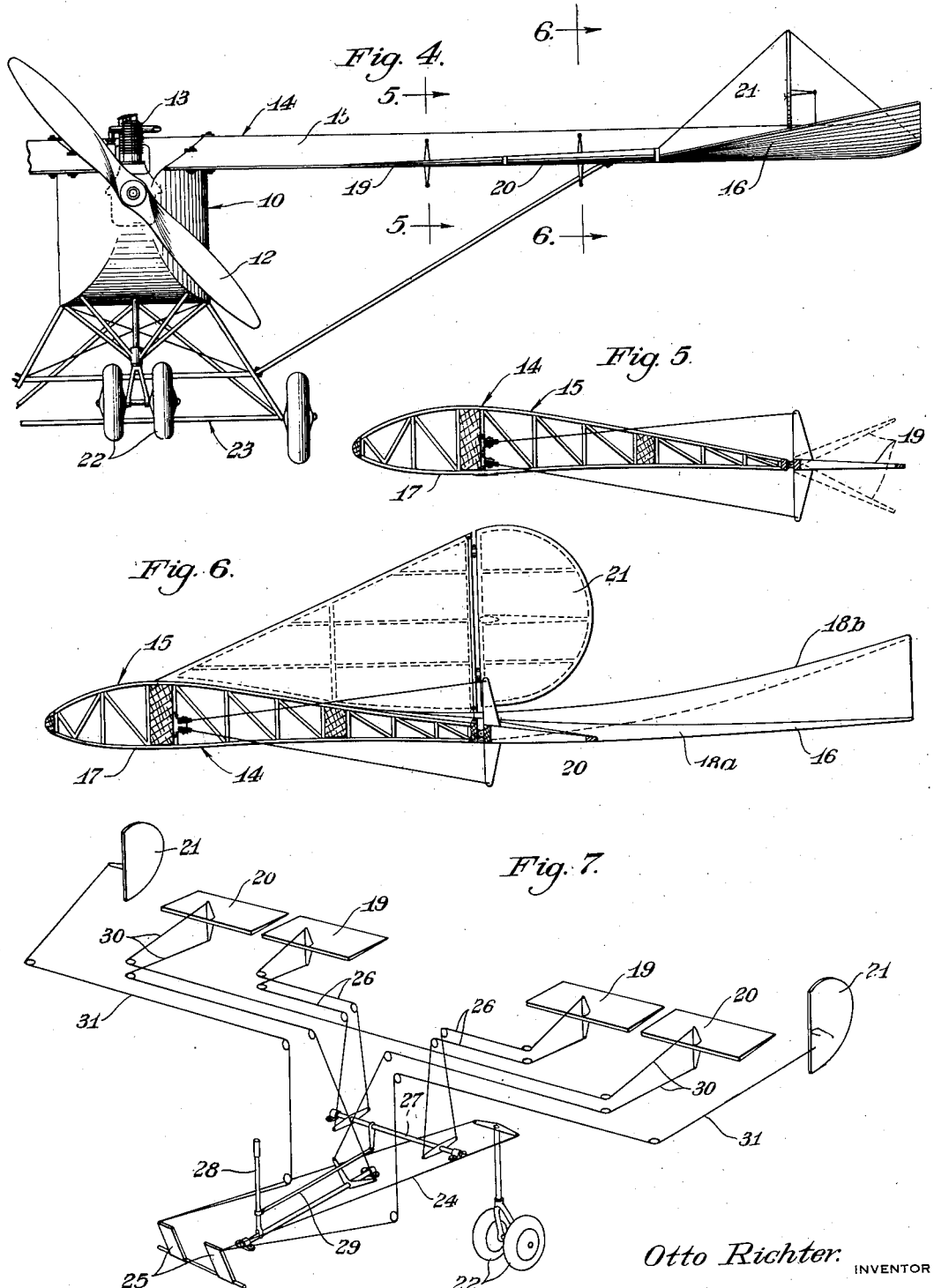
Otto Richter, INVENTOR
BY Victor J. Evans & Co.
HIS ATTORNEYS Patented Aug. 29, 1933

1,924,651

UNITED STATES PATENT OFFICE 1,924,651

AIRCRAFT

Otto Richter, Gary, Ind.

Application September 2, 1932. Serial No. 631,573

1 Claim. (Cl. 244—12)

This invention relates to certain novel improvements in aircraft, and has for its principal object the provision of an improved construction of this character which will be highly efficient in use and economical in manufacture.

It is the object of this invention to provide a novel, inherently stable airplane.

Another object of the invention is to provide a novel, inherently stable aircraft wing structure.

Other objects will appear hereinafter.

The invention consists in the novel combination and arrangement of parts to be hereinafter described and claimed.

The invention will be best understood by reference to the accompanying drawings, showing the preferred form of construction and in which:

Fig. 1 is a top plan view of the new airplane;

Fig. 2 is a front elevational view of the same;

Fig. 3 is a sectional view on line 3—3 of Fig. 2;

Fig. 4 is a fragmentary rear elevational view of the new airplane;

Fig. 5 is a sectional view on line 5—5 of Fig. 4;

Fig. 6 is a sectional view on line 6—6 of Fig. 4; and

Fig. 7 is a diagrammatic view of the control-operating means of the new ship.

In constructing the new airplane the conventional fuselage is eliminated and in place thereof is provided a body generally indicated at 10 and having therein a pilot's compartment 11. The propeller 12 is arranged at the rear of the body 10 as is the motor 13.

The new ship embodies an inherently stable wing structure generally indicated at 14. This wing structure includes a middle section 15 that is substantially rectangular in plan (Fig. 1), and which extends equidistantly from both sides of the body 10 which is built into a unit therewith. Also included in the wing structure 14 are side sections 16 having portions that extend, at substantially a rightangle, rearwardly from the main or middle wing section 15 (Fig. 1). The curvature of the ribs 17 in the middle section 15 is conventional (Figs. 3, 5, and 6) but the ribs 18 in the side wing sections 16 have a reflex curvature, that is, are convex downwardly, relative to the curvature of the ribs in the middle section 15. This reflex curvature of the ribs 18 in each of the side wing sections 16 increases gradually from the innermost rib 18a to the outermost rib 18b of the side sections 16 (Figs. 3, 4, and 6). It has been found that a ship having this wing structure is inherently stable, relatively light, and generally efficient in operation, and that the reflex curvature of the wing sections 16 very effectively balances the ship, since there is thus provided in the wing structure three points of lift or support, all well to the rear of the wing 14; one point of lift being in the main wing section 15 and there being one point of lift in each of the side wing sections 16.

Pivotally mounted on the rear or trailing edge of the center or main wing section 15, one at each side of the fore and aft diameter of the ship, are elevators 19. Also pivotally mounted on the trailing edge of the main or center wing section 15, one at the outer side of each elevator 19, are ailerons 20. Pivotally mounted on the side wing sections 16, along the fore and aft center lines of these sections 16, are directional rudders 21. These controls 19—20—21, and the control-operating means therefor, are shown diagrammatically in Fig. 7, wherein it is indicated that the ground steering wheels 22 of the undercarriage 23 are pivotally mounted on the body 10. These wheels are operated or steered by cables 24 connected to the foot controls or pedals 25. The elevators 19 are operated by cables or flexible elements 26 that are guided over a conventional system of pulleys to a rock shaft 27 which is operated, through a rod and link mechanism 29, by the fore and aft movement of the control stick 28. The lateral movement of the control stick 28 operates the ailerons 20 in unison, through a cable or like flexible element 30 that is guided over a system of pulleys.

The directional rudders 21 are separately operated by the pedals 25 through separate cables or the like 31 that are guided over a conventional system of pulleys.

While I have illustrated and described the preferred form of construction for carrying my invention into effect, this is capable of variation and modification, without departing from the spirit of the invention. I, therefore, do not wish to be limited to the precise details of construction set forth, but desire to avail myself of such variations and modifications as come within the scope of the appended claim.

Having thus described my invention what I claim as new and desire to protect by Letters Patent is:

In an aircraft, a body, a wing structure supported by said body, said wing structure including a center section and including side sections arranged at the sides of said center section and extending in part rearwardly therefrom, each of said side sections including a rib structure having a reflex curvature relative to the curvature of the rib structure in the center section, elevators pivotally mounted on the center section at the trailing edge thereof and one on each side of the fore and aft center line of the craft, ailerons pivotally mounted in the center section at the trailing edge thereof and one between each of said elevators and side sections, directional rudders pivotally mounted on and atop the side sections, and means for operating said elevators, ailerons, and rudders.

OTTO RICHTER.